United States Patent [19]
O'Brien

[11] 3,772,453
[45] Nov. 13, 1973

[54] SEAL ARRANGEMENT FOR PUMP MOTOR LEADS

[75] Inventor: Terrance J. O'Brien, Anaheim, Calif.

[73] Assignee: Purex Corporation, Ltd., Lakewood, Calif.

[22] Filed: June 15, 1972

[21] Appl. No.: 262,947

[52] U.S. Cl. .................. 174/65 SS, 310/71, 310/87
[51] Int. Cl. ............................................. H02k 5/10
[58] Field of Search ...................... 174/65 R, 65 SS, 174/77 R; 310/71, 87, 88

[56] References Cited
UNITED STATES PATENTS
2,218,003  10/1940  Hawley .............................. 310/87
3,055,972  9/1962  Peterson .......................... 174/65 SS FOREIGN PATENTS OR APPLICATIONS
65,307  10/1942  Norway ........................... 174/65 SS OTHER PUBLICATIONS
J. C. Lyons, IBM Technical Disclosure Bulletin, Vol. 1, No. 5, Feb. 1959, page 35.

Primary Examiner—Bernard A. Gilheany
Assistant Examiner—D. A. Tone
Attorney—Louis J. Bachand, Jr. et al.

[57] ABSTRACT

A secondary seal for submersible pump housings and comprising a resilient disc having a taper at its perimeter and plural tapered lead passing apertures adapted to snugly locally confine the motor leads and to maintain the resulting seal by perimetrical confinement and radial inward compression of the disc.

7 Claims, 4 Drawing Figures

PATENTED NOV 13 1973

3,772,453

3,772,453

SEAL ARRANGEMENT FOR PUMP MOTOR LEADS

BACKGROUND OF THE INVENTION

This invention has to do with improvements in the sealing of submersible housings for electrical devices against incursion of water or other fluid likely to corrode or destroy motor and other device components. More particularly, the invention is concerned with a novel seal arrangement for motor leads to a junction box where power cable leads are connected to motor leads.

PRIOR ART

It is known to fluid tightly secure power cable to a junction box for a submersible pump housing by supporting a cable grip assembly by means of an adapter bushing threaded into a wall opening of the junction box. This connection is normally fluid tight. Within the junction box the power cable leads, including a ground lead are suitable connected, e.g., the ground lead to the junction box wall which can be integrally formed with the pump discharge case or other metal housing, and the power leads to the motor leads as desired. The motor leads are typically three to nine in number and correspond to power cable leads. These leads are joined by connectors known per se.

The motor leads pass into the junction box from the motor chamber of the pump housing through an opening provided. It is with the effective sealing of this opening that the present invention is concerned. In the absence of effective sealing at this location, any failure, either catastrophic or by seepage of fluid through and around the primary cable grip seal will permit incursion of fluid e.g., water, or corrosive gases into the motor proper, necessitating motor replacement or extended repair, rather than the much less costly seal repair.

SUMMARY OF THE INVENTION

Accordingly, it is an object of the present invention to provide a means to overcome the problem of relatively great damage to motor and other parts which may be occasioned by failure of the primary cable seal in a submersible pump or like apparatus.

Specifically, the invention provides, in a submersible housing for a pump motor or the like, which includes a first wall opening through which motor leads extend and a second wall opening at which a power cable is secured normally against fluid entry, the power cable leads being connected to the motor leads, the improvement comprising seal means for said first opening against fluid seepage from the junction box to the motor in the event of leakage failure at the second wall opening, the seal means comprising a resilient wafer or disc having plural tapered apertures extending axially thereof, the aperture walls having local radial deflectability outward in response to insertion of an individual motor lead to effect a seal around such lead, the disc or wafer having an axially longitudinally tapered perimeter relatively larger at its greatest diameter than said first opening for insertion into said first opening in perimetrically compressed relation to limit outward deflection of said aperture walls to maintain a seal at said first opening. The disc is typically formed on an elastomeric material, e.g., such material having a Durometer value of at least 30 Shore A and preferably 50 to 60 Shore A.

The apertures may be equidistantly and preferably uniformly circularly distributed, e.g., about a central aperture and in diametrically opposed pairs. The apertures typically have a common degree and direction of taper, the perimeter taper also being common in direction with the aperture taper. The degree of perimeter taper generally is approximately the same or relatively greater than the degree of aperture taper, e.g., 0.5 to 5 times as great.

BRIEF DESCRIPTION OF THE DRAWINGS

The invention will be further described in conjunction with the attached drawings in which.

DESCRIPTION OF THE PREFERRED EMBODIMENTS

Figure 1:
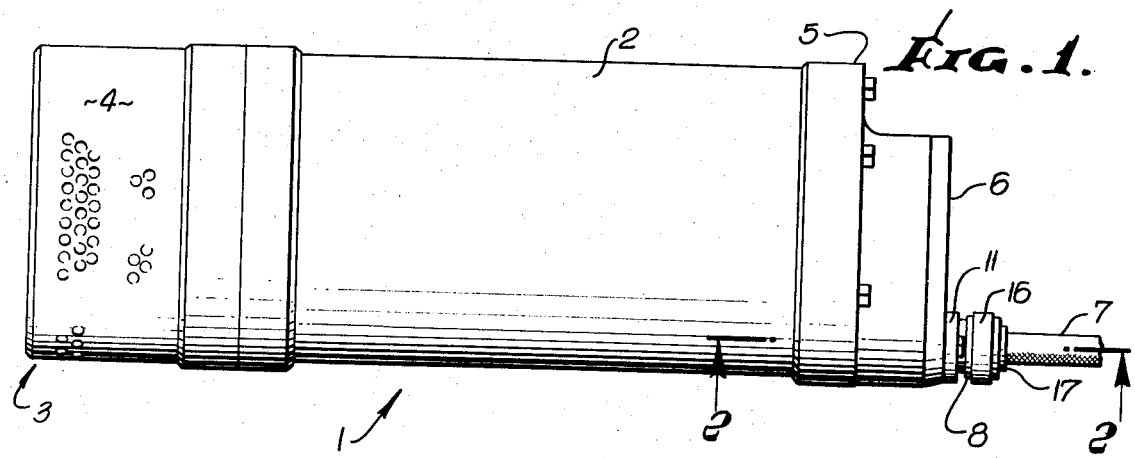
FIG. 1 is a view of elevation of a submersible pump, to which the present invention is typically applied.

With reference now to the drawings, the seal arrangement of the present invention is particularly adapted to submersible pumps such as that shown at 1 in FIG. 1. Pump 1 comprises a housing 2, having an inlet at 3 surrounded by screen 4, and a discharge case 5 having an outlet at 6. Power cable 7 is connected into the discharge case at 8.

Figure 2:
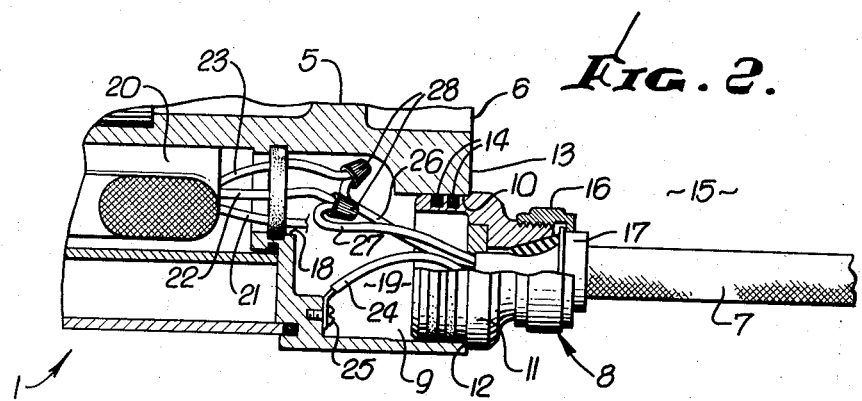
FIG. 2 is a detail view in vertical section of the junction box portion of the pump, the view being taken on line 2—2 in FIG. 1.

In FIG. 2, junction box 9 formed within the discharge case 5 is shown having a wall opening at 10 into which adapter 11 is inserted, butted at shoulder 12 to the case wall 13 and secured, sealed by O-rings 14 against fluid entry from without the pump, at 15. The cable 7 is secured to the adapter 11 by cable grip 16 threaded onto the adapter over bushing 17.

The junction box 9 has another wall opening 18 which communicates the junction box interior 19 with the motor chamber 20. The invention is concerned with sealing the opening 18.

As will be apparent from the drawings, the several power cable leads 21, 22, 23, representative of any number of such leads, e.g., three to nine motor leads, extend through opening 18 from the motor chamber 20 to the junction box interior 19. The cable 7 is grounded by lead 24 connected by screw 25 to the discharge case 5. Other power cable leads 26, 27 are connected to motor leads 23, 22 by means of conventional connectors 28.

As will be evident, the junction box 9 and the leads and connections therewithin are primarily protected from water, moisture vapor or other harmful fluid, e.g., corrosive gases in which the pump might be placed by the O-ring seals 14 about the adapter 11.

This invention provides a secondary seal between the motor chamber 20 and junction box 9 in the event of failure at the primary seal point. In this manner, if the primary seal fails, and, e.g., water enters the junction box 9, the device is at most shorted out; but the motor, and other components beyond the junction box are protected. Moreover, the junction box connections may be potted to prevent even shorting out. Accordingly repair of the pump will involve merely replacement of the O-ring seals 14.

Figure 3:
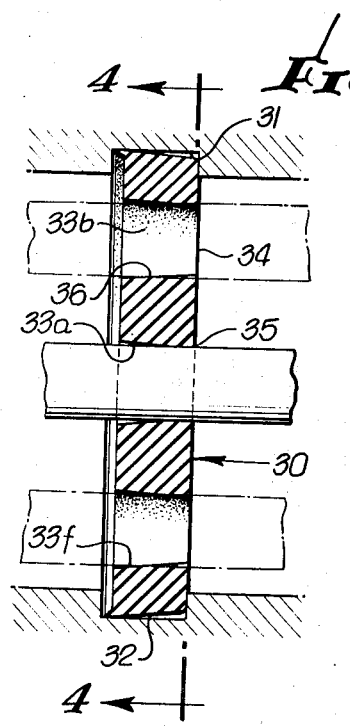
FIG. 3 is a center vertical section of the seal disc of the invention, in position.

The mentioned secondary seal is best shown in FIG. 3 and comprises a circular disc 30 which is fitted into an annular groove 31 formed in the junction box wall opening 18. The disc is formed of an elastomeric material, such as natural or synthetic rubber, ethylene-polymeric, e.g., polyolefin material having sufficient resilience, i.e., an ability to recover its shape when distorted. Suitable as such materials are those having a Durometer number above about 30 Shore A. The disc 30 is formed with a tapered perimeter 32 for purposes to appear.

Figure 4:
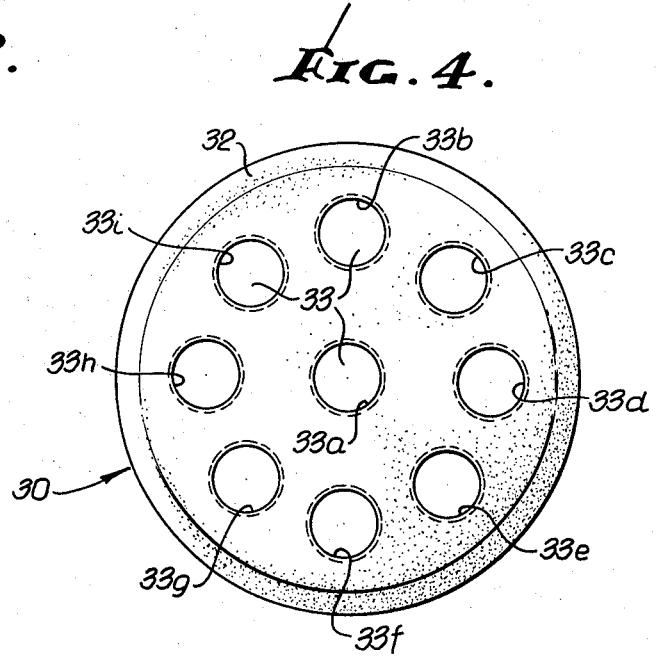
FIG. 4 is a front view of the disc, taken on line 4—4 in FIG.3.

A plurality of lead passing apertures 33 are provided in the disc 30. A typical arrangement is shown in FIG. 4 where a central aperture 33a is shown with radially displaced apertures 33b–i distributed circularly therearound and in diametrically opposed pairs, e.g., 33h and 33d. Other arrangements may be used and the number and spacing of apertures 33a–i varied to correspond to the number of motor leads.

The disc apertures 33a–i are each commonly tapered along the longitudinal axis of the disc 30 to a minimum diameter at 34 which is less than the average diameter of the motor lead 21–23 whereby the aperture receiving the lead is locally deflected as at 35 to accommodate the greater lead diameter. The resilient nature of the disc 30 as noted above gives a local deflectability to the aperture walls 36 enabling the stretching accommodation of the inserted lead. The relatively wider portion of the apertures 33a–i facilitates locating the lead in an aperture. The degree of taper in each aperture is typically between 2° and 5° and both the degree of taper and direction of taper are generally common among the several apertures.

As noted, the perimeter 32 of the disc 30 is likewise tapered. The maximum diameter of the disc is greater than the diameter of annular groove 31 defining the junction box wall opening 18. Accordingly insertion of the disc 30 into the groove 31 circumferentially compresses the disc exerting a squeezing or restrictive zone on the apertures 33a–i which limits or restricts the local deflection of the aperture walls 36 and accordingly enhances the snugness of fit of the disc 30 into the groove 31, all to ensuring a leak-proof closure across the wall opening 18.

I claim:

1. In combination: a submersible housing for a pump motor or the like, which includes a first wall opening through which motor leads extend and a second wall opening at which a power cable is secured normally against fluid entry, said power cable having leads connected to the motor leads, and seal means for said first opening against fluid seepage to the motor in the event of leakage failure at the second wall opening, said seal means comprising a resilient disc having plural tapered apertures extending axially of the water disc, the aperture walls having limited local radial deflectability outward in response to insertion of an individual motor lead to effect a seal around such lead, said disc having a longitudinally tapered perimeter relatively larger at its largest dimension than said first opening for insertion into said first opening in perimetrically compressed relation to restrict outward deflection of said aperture walls to maintain a seal at said first opening.

2. The combination according to claim 1 in which said disc perimeter taper is from 0.5 to 5 times greater than said aperture taper.

3. The combination according to claim 1 in which said disc is formed of elastomeric material.

4. The combination according to claim 1 in which said disc apertures are equidistantly distributed.

5. The combination according to claim 1 in which said apertures having a common degree and direction of taper and said perimeter taper is common in direction with said aperture taper.

6. The combination seal means according to claim 1 in which said disc apertures are uniformly circularly distributed.

7. The combination according to claim 6 in which said disc is formed of an elastomeric material having a Durometer value of at least 30 Shore A.

* * * * *